United States Patent [19]

Krumme et al.

[11] Patent Number: 4,613,352
[45] Date of Patent: Sep. 23, 1986

[54] DISPLACEMENT PICK-UP ARRANGEMENT FOR THE POSITION DETECTION OF A PRESSING PLUNGER

[75] Inventors: Manfred Krumme, Porta Westfalica; Gerhard Geisel, Bückeburg, both of Fed. Rep. of Germany

[73] Assignee: Hermann Heye, Obernkirchen, Fed. Rep. of Germany

[21] Appl. No.: 690,972

[22] Filed: Jan. 11, 1985

[30] Foreign Application Priority Data

Jan. 18, 1984 [DE] Fed. Rep. of Germany ....... 3401465

[51] Int. Cl.⁴ ............................................. C03B 11/16
[52] U.S. Cl. ....................................... 65/158; 65/160; 65/163; 65/164; 65/318
[58] Field of Search ................. 65/160, 163, 168, 158, 65/318

[56] References Cited

U.S. PATENT DOCUMENTS 3,192,027 6/1965 Wilhelm ........................... 65/164 X
4,369,053 1/1983 Becker et al. ........................ 65/164

Primary Examiner—Arthur Kellogg
Attorney, Agent, or Firm—Michael J. Striker

[57] ABSTRACT

A displacement pick-up arrangement for the position detection of a plunger is a component of a pressing station of a section of an I.S. glass-forming machine in which a plunger is inserted into a mold recess of a parison mold holding a glass gob at this time, and includes a ring-shaped core which is carried by a piston rod mounted to said plunger. The core forms an actuating element for changing the inductivity of a coil which is arranged in a ring-shaped frame between a cylinder and a guiding cylinder for the plunger.

11 Claims, 6 Drawing Figures

DISPLACEMENT PICK-UP ARRANGEMENT FOR THE POSITION DETECTION OF A PRESSING PLUNGER

BACKGROUND OF THE INVENTION

The present invention relates to a pick-up arrangement for detecting axial displacement of a pressing plunger.

Arrangements of the above-mentioned general type are known in art. One of such arrangements is disclosed, for example, in the U.S. Pat. No. 3,180,718. This arrangement is formed as a displacement pick-up which has a primary winding and two secondary windings of a differential transformer each embedded in an outer peripheral groove of a stationary inlet pipe produced of an electrically insulating material for pressure air cooling of the plunger. The plunger is mounted on a metal tubular piston rod whose free end surrounds the inlet pipe as an actuating element. By the movement of the piston rod relative to the windings, the differential transformer produces a variable output signal which is proportional to the movement of the plunger and represents a value of both the movement and the insertion depth of the plunger into the parison mold. The output signal is advantageously indicated and/or displayed in writing. As an alternative, it can be used also for controlling the gob size. This known pick-up arrangement is relatively expensive, is not sufficiently resistant mechanically bacause of the non-metallic cooling air inlet pipe, and can be handled only by skilled personnel. A temperature compensation is required when in accordance with the conventional practice the cooling air inlet pipe which carries the windings is acted upon only intermittently with cooling air and the temperature of the windings respectively changes constantly within wide limits. Also, a more than two-wire electric connecting cable is required.

The U.S. Pat. No. 4,369,053 discloses a pick-up arrangement for an I.S. glass forming-machine which has a rod displaceably guided in the cylinder wall and provided with a sensing member arranged in the movement path of the plunger or the plungers. The windings of a differential transformer are arranged in an opening provided in the cylinder wall in alignment with the rod. A core connected with the rod and insertable into the windings serves as an actuating element. Despite the fact that in this arrangement a temperature compensation is no longer necessary, the structural expenses in view of the limited space condition in the cylinder wall are relatively high.

The DE-OS No. 2,923,705 discloses an I.S. glass-forming machine in which the end region of the path of the actuating piston of the plunger or the piston rod of the actuating piston is measured. The covered displacement must be detected with the aid of a pick-up and made visible. This is attained for example by several electrical contacts arranged in the movement region which are sensed one after the other. It also provides a possibility to use the values detected by the pick-up for regulating the size of the glass gobs to be supplied into the parison molds, for example by adjustment of the shears which sever the glass gobs from a stream of molten glass.

SUMMARY OF THE INVENTION

Accordingly, it is an object of the present invention to provide a pick-up arrangement for the displacement of a pressing plunger, which improves the constructions of the prior art.

More particularly, it is an object of the present invention to provide a pick-up arrangement for the displacement of a plunger, which is wear-free, simpler in handling and construction, and has lower costs.

In keeping with these objects and with others which will become apparent hereinafter, one feature of the present invention resides, briefly stated, in a pick-up arrangement for the displacement of a plunger, in which a coil in the region of a cylinder end receiving a piston rod surrounds the piston rod, and an actuating element is formed as a ring-shaped core which is completely or partially moveable into the coil and arranged on a piston side facing towards the plunger.

Advantageously, the coil is arranged concentrically to the piston rod and cast with a special casting mass to a self-supporting coil, without a coil body, in a ring-shaped frame. It suffices to cover with the pick-up only approximately the last 20 mm of the piston stroke prior to the upper end position. During pressing of the glass gobs the piston typically reaches the middle point of this region when the proper filling degree of the mold is reached. Thus during each working stroke of the plunger its maximum insertion depth in the mold can be detected by measurement and an analogue electrical signal of high accuracy can be produced. With these signals the filling degree of the parison mold is detected and supplied to a regulator as an actual value. The regulator forms, from the comparison of this actual value and a nominal value, an adjusting value for changing the mass of the gobs.

The cost for the manufacturing of this pick-up arrangement amounts only to a fraction of the cost of the known systems. The pick-up arrangement is insensitive, it is not subjected to wear and can be reliably mounted by a non-experienced person. A temperature compensation is not required, since the coil in each case is arranged in a region of a sufficiently constant temperature. The electrical connection of the coil with the subsequently arranged circuits can be provided in an extremely simple manner. A 2-wire electric connecting cable will suffice, for which, for example, a coaxial plug can be used, so that a "blind" reliable mounting of the connecting parts of the pick-up arrangement even in the frequently unaccessable surrounding space is possible.

In accordance with another feature of the present invention, an annular chamber is provided between the piston and the coil and the core surrounding the piston rod moves into and out of this annular chamber. This provides for an especially simple construction of the pick-up arrangement with favorable condition for the magnetic flux.

Still another feature of the present invention is that the core is composed of a diamagnetic conductive or ferromagnetic material. In particular, the core can be composed of copper or steel.

In accordance with a further feature of the present invention, a ring disk extending adjacent to the piston rod is arranged at a coil side facing toward the plunger and composed of magnetically conductive material. Because of this, the guidance of the magnetic field in the region of the pick-up arrangement is improved.

Still a further feature of the present invention is that the coil is retained in a frame which connects a radially outwardly extending flange of the frame with a cylinder end receiving the piston rod, and an electrical connecting conduit of the coil extends outwardly through the flange. With these features the pick-up arrangement forms a self-contained structural unit which can be connected easily and fast with the adjoining structural elements of the forming machine, particularly with the cylinder of the cylinder-piston unit and, if need be, with a subsequent guiding cylinder for the plunger. This construction provides for special advantages in the event of exchange of the pick-up arrangement or the adjoining structural elements. The electrical connection of the coil is further considerably simplified. Thus a 2-pole plug connection in the flange of the frame can be provided.

Yet a further feature of the present invention is that the core has such an outer contour that it provides at least approximately linear relation between the path covered by the core and the electrical voltage produced thereby at the output of the pick-up arrangement. This at least approximately linear characteristic line is favorable for a high resolution of the pick-up arrangement.

In accordance with another feature of the present invention, a first connecting point of the coil is connected with a reference potential and a second connecting point of the coil is connected via a first resistance with an output conduit of a constant alternating voltage generator. In such a circuit the alternating voltage $U_2$ for example is displayed by a voltmeter and/or recorded by a recording device. Advantageously one constant alternating voltage generator can be used in some cases also for several pick-up arrangements within the same forming machine. The frequency of the alternating voltage can be on the order of for example 2 kHz.

Another feature of the present invention is that the constant alternating voltage generator supplies a bridge circuit whose one branch is formed by the first resistance in the output conduit and the complex resistance of the coil and whose other branch is formed by a second resistance and a variable resistance in a conduit which is connected to said output conduit, on the one hand, and with the reference potential, on the other hand. A first conduit extends from a connecting point between the second resistance and the variable resistance and a second conduit is connected with the second connecting point of the coil.

In the circuit in accordance with this feature, the coil to be affected operates in the electrical bridge circuit as affectable complex resistance, and the height of the obtained alternating voltage $U_2$ depends on the condition of affecting of the inductivity of the coil by the ring-shaped core.

Finally, the first and the second conduit can each have a diode and can each be connected with a filtering member which is connected with the reference potential and smoothes the direct voltage. This feature serves for the signal processing.

The first conduit can be connected with a first input of an operational amplifier and the second conduit can be connected via a third resistance with a second input of the operational amplifier, whereas an output conduit of the operational amplifier is connected with the second input of the operational amplifier via a feedback conduit containing a variable feedback resistance. With the circuit described here, there is obtained at the output conduit of the operational amplifier a direct voltage signal with a position and amplitude dependent on the respective axial position of the ring-shaped core inside the coil and thereby of the plunger.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
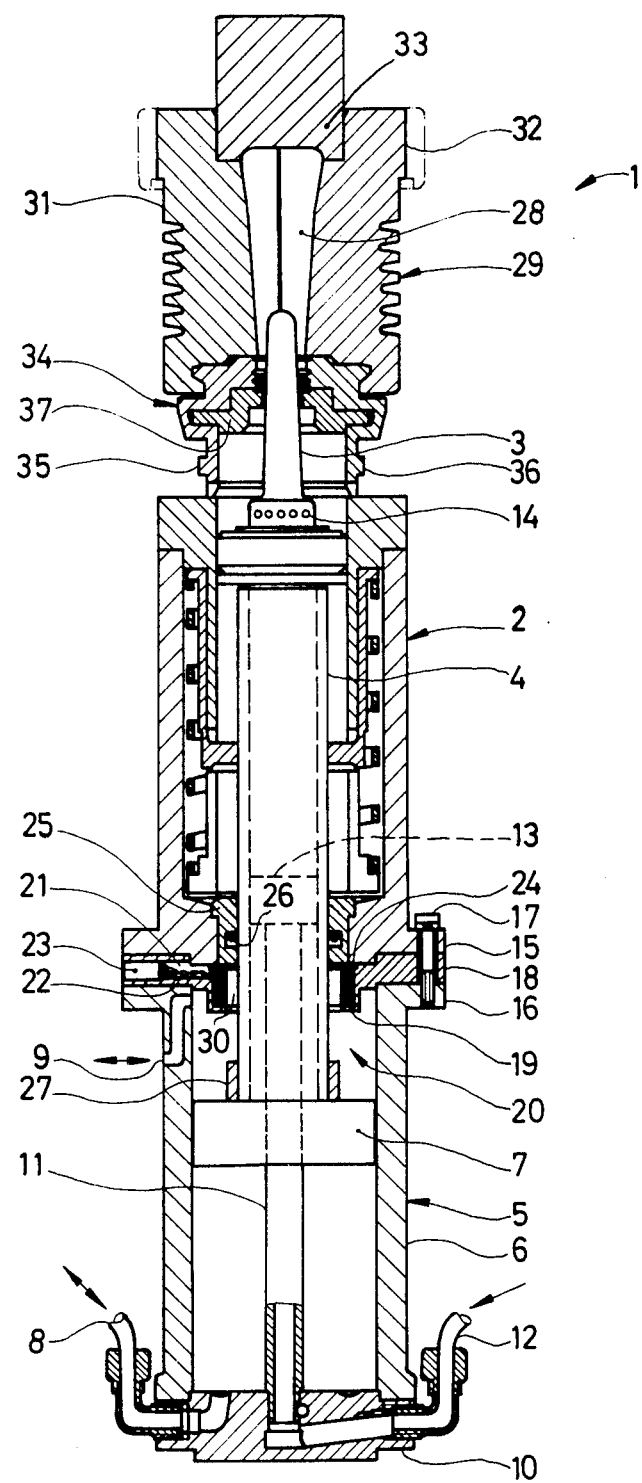
FIG. 1 is a view showing a longitudinal section of a part of a pressing station of an I.S. glass-forming machine.

As shown in FIG. 1 a pressing station 1 of a not-shown section of an I.S. glass forming machine has a plunger 3 which is guided in a known manner longitudinally in a guiding cylinder 2. The plunger 3 is mounted on a piston rod 4 of a pneumatically operated cylinder-piston 5. The cylinder-piston unit 5 has a cylinder 6 and a piston 7 longitudinally displaceable in the cylinder 6. Pressure air conduits 8 and 9 make the cylinder-piston unit 5 a double acting unit.

The cylinder 6 has a bottom 10. A supply pipe 11 for a cooling fluid, for example a cooling air, is mounted in the bottom 10 and supplied with cooling fluid through a connecting conduit 12. The supply pipe 11 extends coaxially with the unit formed of the hollow piston rod 4 and ring-shaped piston 7 into the unit and has at its upper end a sealing piston 13 which is sealed against the inner wall of the piston rod 4. The cooling fluid flows through the sealing piston 13 upwardly into a remaining chamber of the piston rod 4 and from there it flows into and through the plunger 3 and then exits the latter through outlet openings 14 provided on the periphery of the plunger.

A ring-shaped frame 18 for a coil 19 of a displacement pick-up 20 is mounted between a bottom flange 15 of the guiding cylinder 2 and a head flange 16 of the cylinder 6. The frame 18 has a substantially radial passage 21. A 2-wire connecting cable 22 of the coil 19 extends through the radial passage 21 and is connected with a coaxial plug connector 23 provided at the periphery of the frame 18.

For favorable affecting of the magnetic flux, the coil 19 is provided at its side facing toward the plunger 3 with a ring-shaped disk 24 which extends adjacent to the piston rod 4 and is composed of a magnetically conductive material. Above the disk, a guiding bush 25 for the piston rod 4 is located. The guiding bush 25 is held in the bottom flange 15 of the guiding cylinder 2. An inner sealing ring 26 is inserted in the guiding bush 25 and cooperates with the piston rod 4.

An actuating element of the pick-up 20 is a ring-shaped core 27 composed of a ferromagnetic or diamagnetic conductive material. The core 27 is partially or completely moveable into the coil 19 and is arranged on the piston 7, and more particularly at its side facing toward the plunger 3. The core 27 can be composed for example of copper or steel.

Since FIG. 1 shows the plunger 3 in a relatively deep position, and the maximum insertion depth of the plunger 3 into a mold recess 28 of the pressing or parison mold 29 must be measured, the core 27 in FIG. 1 has not yet entered an annular chamber 30 between the coil 19 and the piston rod 4, so that it does not yet change the inductivity of the coil in this position. This takes place in significant and evaluatable degree first when the core 27 enters the annular chamber 30 as shown in FIG. 2.

The parison mold 29 includes in a known manner parison mold intermediate part halves 31 and 32, a parison mold bottom 33, and a neck mold 34. The neck mold 34 includes neck ring halves 35 and 36 and a one-piece guiding ring 37 for the plunger 3 held by the neck ring halves.

Alternatively, the coil 19, the connecting cable 22 and the coaxial plug connector 23 as well as in some cases the ring-shaped disk 24 can be arranged in the bottom flange 15 of the guiding cylinder 2. In this case, however, the exchange of the guiding cylinder 2 or the coil 19 together with the attachments would be more difficult and time consuming.

Figure 2:
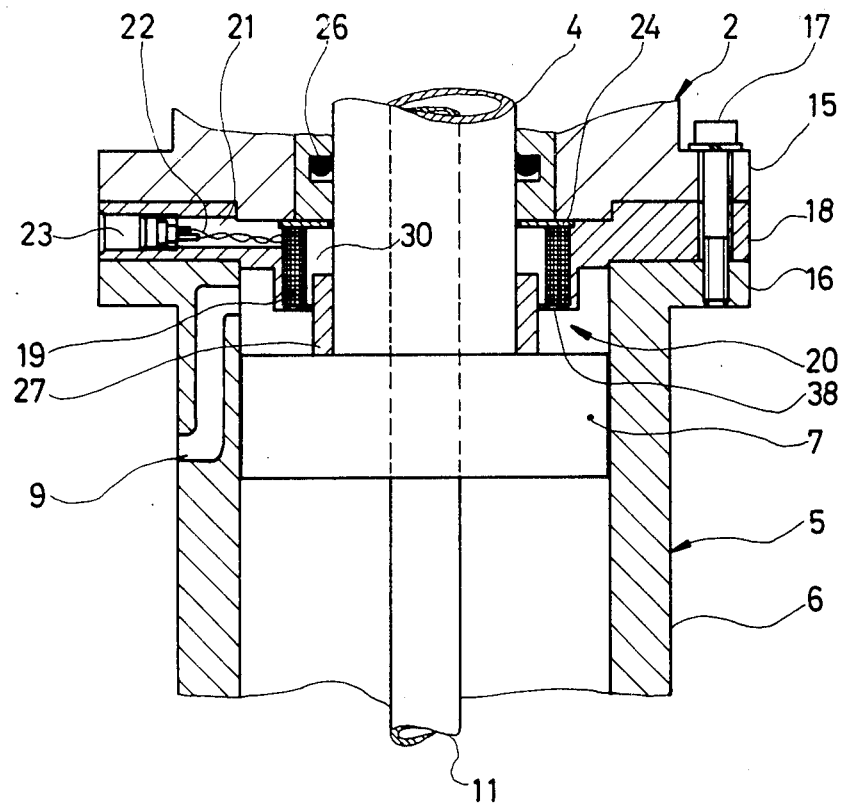
FIG. 2 is a view showing a fragment of FIG. 1 on an enlarged scale.

FIG. 2 shows a fragment of FIG. 1 on an enlarged scale, in which the piston rod 7 and thereby the piston rod 4 and the core 27 are located in a typical upper end position. In this position the plunger 3 not shown in FIG. 2 is inserted the deepest into a gob of a molten glass located in the mold recess 28. From this respective upper pressing end position, in each working cycle a value for the filling degree of the mold recess 28 with molten glass can be derived. A lower end surface 38 of the frame 18 is permanently located in an axial distance from the piston 7.

Figure 3:
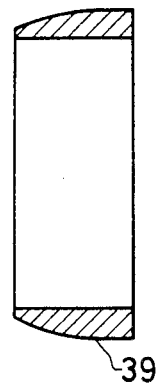
FIG. 3 is a view showing another embodiment of a ring-shaped core of FIGS. 1 and 2, in a longitudinal section.

FIG. 3 shows a ring-shaped core 39 which can be used instead of the core 27 shown in FIGS. 1 and 2. The outer contour of the core 39 reduces in direction toward the plunger which is not shown in FIG. 3 so that, as will be described later on in connection with FIG. 5, at least approximately linear ratio between the path or displacement covered by the core 39 in the annular chamber 30 and the electrical voltage produced thereby at the output of the pick-up 20 is provided.

Figure 4:
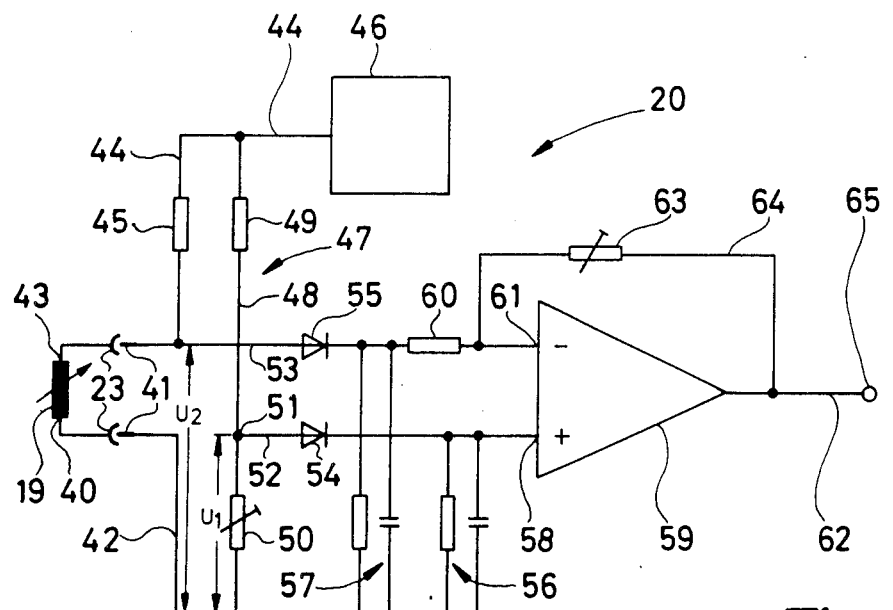
FIG. 4 is a view showing a circuit for a displacement converter of with the inventive pick-up arrangement.

FIG. 4 represents a second control circuit of the pick-up 20 and shows a constant alternating voltage generator 46 which supplies a bridge circuit 47 via an output conduit 44. A first branch of the bridge circuit 47 is formed by a first resistance 45 in the output conduit 44 and the complex resistance of the coil 19. The coil has a first connecting point 40 and a second connecting point 43 and is connected with the output conduit 44 and a conduit 42 connected with a reference potential, via a coaxial plug 41. A second branch of the bridge circuit 47 includes a second resistance 49 and a variable resistance 50 in a conduit 48. The alternating voltages $U_1$ and $U_2$ in the bridge branches are supplied via a first conduit 52 and a second conduit 53 to diodes 54 and 55, wherein they are rectified and smoothed in subsequently connected filtering members 56 and 57. The circuit is provided with a differential amplifier which includes an operational amplifier 59 a third resistance 60 in the conduit 53 and a variable feedback resistance 63 in a feedback conduit 64. With this differential amplifier the difference of both voltages at the filtering members 56 and 57 is amplified. The operational amplifier 59 has a first input 58 and a second input 61. Therefore in an output or connecting point 65 of an output conduit 62 an electrical voltage signal corresponding to the axial position of the plunger 3 is obtained. The connecting point 65 is connected to a first control circuit (not shown) of means (not shown) for adjusting the mass of gobs of molten glass or another thermoplastic material.

Figure 5:
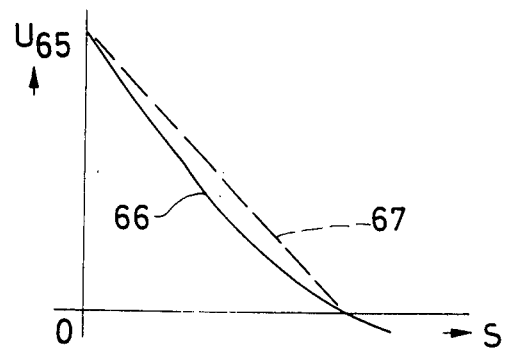
FIGS. 5 and 6 are views showing characteristic lines of the displacement converter.
Figure 6:
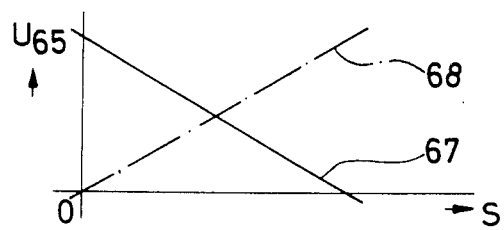

In diagrams shown in FIGS. 5 and 6 the electrical voltage $U_{65}$ present in the connecting point 65 is represented versus the path or displacement s covered by the core 27 or 29 and thereby by the plunger 3. Only the last part of the path of the plunger 3 entering the mold recess is decisive, when the core 27 or 39 affects the inductivity of the coil 19.

FIG. 5 shows a solid curved characteristic line 66 produced with the use of the core 27 having a substantially rectangular longitudinal cross-sectional area. When the core 39 of the modified outer contour of FIG. 3 is used, a practically linear characteristic line 67 is obtained, as shown in broken lines in FIG. 5. In FIG. 6 the linear characteristic line 67 is shown in solid line. When the diodes 54 and 55 of FIG. 4 are changed in polarity, a characteristic line 68 with the opposite slope is obtained, as shown in dash-dot lines in FIG. 6.

The variable resistance 50 in FIG. 4 serves for adjusting the voltage $U_1$ and therefore for displacement of the characteristic lines 66–68 in FIGS. 5 and 6 in direction of the ordinate. In contrast, the variable feedback resistance 63 in FIG. 4 serves for adjusting of the amplification of the operational amplifier 59 and therefore for affecting of the steepness of the characteristic lines 66–68 of FIGS. 5 and 6.

An alternating voltage $U_2$ takes place between the second conduit 53 and the reference potential. In deviation from FIG. 4, $U_2$ can be supplied for providing a display on a voltmeter and/or can be recorded by a recorder, if need be with suppression of the zero point.

The connecting point 65 of the pick-up 20 can electrically connected with any suitable control circuit for guiding a dosing element for adjusting the mass of the gobs of the molten glass or other thermoplastic material. Such a control circuit is disclosed, for example, in FIG. 8 and also in FIG. 9 of the U.S. Pat. No. 4,369,053. Therefore in the frame of the present disclosure a detailed description of such a control circuit and the dosing element guided thereby can be dispensed with.

It will be understood that each of the elements described above, or two or more together, may also find a useful application in other types of constructions differing from the types described above.

While the invention has been illustrated and described as embodied in a pick-up arrangement for an arrangement for adjusting the mass of gobs of molten glass or other thermoplastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A displacement pick-up arrangement for means for adjusting the mass of gobs of molten glass or another thermoplastic material which are successively severed from a stream of said material and supplied into a mold of a forming machine and after this positively deformed by a pressing plunger mounted on a piston rod of a piston moveable in a cylinder of a cylinder-piston unit; the pick-up arrangement comprising a coil fixed relative to said cylinder and a metallic actuating element fixed relative to said piston and cooperating with said coil for changing the inductivity of said coil in dependence on relative axial displacement between the piston and the cylinder; said adjusting means comprising a first control circuit electrically connected with said displacement pick-up arrangement for controlling a dosing element for adjusting the mass of the gobs; said coil being arranged in the region of an end of said cylinder through which said piston rod extends so that said coil surrounds the piston rod; and said actuating element being formed as a ring-shaped core which is arranged at that side of said piston, which faces toward said plunger, and is entirely or partially moveable into said coil and back out again.

2. A pick-up arrangement as defined in claim 1, wherein an annular chamber is formed between said coil and said piston rod, said core which surrounds said piston rod being moveable into and out of said annular chamber.

3. A pick-up arrangement as defined in claim 1, wherein said core is composed of a diamagnetic conductive material.

4. A pick-up arrangement as defined in claim 1, wherein said core is composed of a ferromagnetic material.

5. A pick-up arrangement as defined in claim 1, wherein said coil has an end side facing toward said plunger and is provided at said end side with a ring-shaped disk composed of a magnetically conductive material and extending close to said piston rod.

6. A pick-up arrangement as defined in claim 1; and further comprising a frame which holds said coil and has a radially outwardly extending flange connected with an end of said cylinder through which said piston rod extends, and an electrical connecting conduit for said coil extending through said flange outwardly beyond the latter.

7. A pick-up arrangement as defined in claim 1; and further comprising a second control circuit having an output connected to said first control circuit, said core having an outer contour which is formed so that an at least approximately linear ratio is produced between a path or displacement covered by said core and an electrical voltage obtained at said output.

8. A pick-up arrangement as defined in claim 1; and further comprising a second control circuit connected to said first control circuit and including a constant alternating voltage generator having an output conduit and a first resistance, said core having a first connecting point connected with a reference potential and a second connecting point connected via said first resistance with said output conduit of said constant alternating voltage generator.

9. A pick-up arrangement as defined in claim 8; wherein said second control circuit includes a bridge circuit which has one branch composed of said first resistance in said output conduit and the complex resistance of said coil and another branch composed of a second resistance and a variable resistance in a conduit connected on the one hand with said output conduit and connected on the other hand with the reference potential, said second resistance and said variable resistance being connected in a connecting point, and a first conduit extending from said connecting point, and a second conduit being connected with said second connecting point of said coil.

10. A pick-up arrangement as defined in claim 9, wherein in said second control circuit said first conduit and said second conduit respectively have a diode and are connected to a filtering member connected with the reference potential and smoothing the direct voltage obtained at an output of said diodes.

11. A pick-up arrangement as defined in claim 10, wherein said second control circuit has an operational amplifier with a first input connected with said first conduit and a second input connected with said second conduit via a third resistance, and a feedback conduit having a variable feedback resistance, said operational amplifier having an output conduit which is connected on the one hand via said feedback conduit with said second input of said operational amplifier and on the other hand with an output of said second control circuit, said output being connected to said first control circuit.

* * * * *